United States Patent [19]

Bolt et al.

[11] Patent Number: 5,508,239

[45] Date of Patent: Apr. 16, 1996

[54] HIGH STRENGTH ALUMINUM NITRIDE FIBERS AND COMPOSITES AND PROCESSES FOR THE PREPARATION THEREOF

[75] Inventors: John D. Bolt, Landenberg, Pa.; Frederick N. Tebbe, Hockessin, Del.

[73] Assignee: E. I. Du Pont de Nemours and Company, Wilmington, Del.

[21] Appl. No.: 578,408

[22] Filed: Sep. 7, 1990

[51] Int. Cl.$^6$ ............................. C04B 35/581; B05D 5/12
[52] U.S. Cl. .................................................. 501/95; 264/66
[58] Field of Search ................................. 501/95; 264/66

[56] References Cited

U.S. PATENT DOCUMENTS

| | | | |
|---|---|---|---|
| 3,529,044 | 9/1970 | Santangelo | 264/29 |
| 3,846,527 | 11/1974 | Winter et al. | 264/63 |
| 3,922,475 | 11/1975 | Manasevit | 156/612 |
| 4,010,233 | 3/1977 | Winter et al. | 264/63 |
| 4,578,365 | 3/1986 | Huseby et al. | 501/98 |
| 4,687,657 | 8/1987 | Clark et al. | 423/412 |
| 4,740,574 | 4/1988 | Bolt et al. | 528/9 |
| 4,761,388 | 8/1988 | Oguri et al. | 501/95 |
| 4,857,246 | 8/1989 | Bolt | 264/29.2 |
| 4,863,799 | 9/1989 | Minnini et al. | 501/95 |
| 4,865,830 | 9/1989 | Klabunde et al. | 501/96 |
| 4,869,925 | 9/1989 | Hiai et al. | 501/96 |
| 4,908,340 | 3/1990 | Frechette et al. | 501/90 |
| 5,041,512 | 8/1991 | Tebbe | 528/9 |

FOREIGN PATENT DOCUMENTS

| | | |
|---|---|---|
| 839321 | 4/1970 | Canada . |
| 213629 | 3/1987 | European Pat. Off. . |
| 54-13439 | 5/1979 | Japan . |
| 61-124626 | 6/1986 | Japan . |

OTHER PUBLICATIONS

Portnoi, K. I. et al., "Growth of AlN Whiskers During the Nitriding of Aluminum", May, 1970, pp. 360–363.

Gribkov, V. N. et al., "Strength of Aluminum Nitride Whiskers", Oct., 1977, pp. 1432–1434.

Portnoi, K. I. et al., "Role of Liquid Drops in the Growth of Filamentary Crystals of Aluminum Nitride", Oct., 1970, pp. 1551–1555.

Laubengayer, A. W. et al., "Aluminum–Nitrogen Polymers by Condenstation Reactions", Feb. 5, 1961, pp. 542–546.

Interrante, Leonard V., et al., "Studies of Organometallic Precursors to Aluminum Nitride", Mat. Res. Soc. Symp. Proc. 73 (1986), pp. 359–366.

*Primary Examiner*—Donald P. Walsh
*Assistant Examiner*—Chrisman D. Carroll

[57] ABSTRACT

Shaped articles of polycrystalline aluminum nitride are disclosed having a tensile strength of at least about 100 Kpsi. The shaped articles are preferably fibers. Composites of polycrystalline AlN fibers in a matrix of organic or inorganic polymer, metal, glass or ceramic are also disclosed herein. The process for the preparation of polycrystalline aluminum nitride fibers is covered.

6 Claims, No Drawings

HIGH STRENGTH ALUMINUM NITRIDE FIBERS AND COMPOSITES AND PROCESSES FOR THE PREPARATION THEREOF

FIELD OF THE INVENTION

This invention relates to polycrystalline aluminum nitride fibers having superior tensile strengths. More particularly, this invention relates to shaped articles and composites of these fibers and processes for the preparation thereof.

BACKGROUND OF THE INVENTION

Shaped articles of aluminum nitride, especially fibers thereof, are sought because they possess high thermal conductivity; hence, they are useful in electronic applications where heat dissipation is necessary. Thermal conductivity may be an order of magnitude higher than that of alumina but depends critically on material purity. These considerations are discussed in U.S. Pat. No. 4,578,365, in relation to the preparation of bulk ceramic articles of aluminum nitride.

Fibers composed nominally of aluminum nitride may be prepared by a number of prior art methods. In one reaction utilizing inexpensive raw materials, alumina and carbon, or an organic precursor thereof, are heated at elevated temperatures in the presence of nitrogen, whereupon aluminum nitride is formed. This is a classic text-book reaction and is described in detail in E.P. 0213 629 and in U.S. Pat. No. 4,857,246. However, this reaction requires careful stoichiometric control and often results in excess carbon or unconverted alumina, either of which impacts dramatically on thermal conductivity. In fiber formation, incomplete sintering (densification) or excessive grain growth can also result, either of which results in inferior fibers.

Laubengayer et al., J. Amer. Chem. Soc., 83, pages 542 to 546 (1961), disclose the reactions of amines at low temperatures with aluminum alkyls or alkyl aluminum chlorides to form 1:1 addition compounds. When such addition compounds having N—H and Al—R bonding are pyrolyzed, aluminum nitride is produced.

Interrante et al., in Mat. Res. Soc. Symp. Proc. 73 (1986), pages 359–366, disclose the conversion of $C_2H_5AlNH$ to aluminum nitride in the presence of ammonia. The aluminum nitride produced with ammonia contained less carbon than that formed without it. Interrante et al., also disclose that $C_2H_5AlNH$ is converted to aluminum nitride at 300° C. to 900° C. with retention of morphology.

Japanese Patent 54-13439 discloses a method for the production of aluminum nitride in the form of a powder.

Additional relevant background references include the following: Strength of Aluminum Nitride Whiskers, Gribkov et al., Izvestiya Akademii Nauk SSSR, Neorganicheskie Materialy, Vol. 13 (10) pages 1775 to 1778, (1977); Role of Liquid Drops in the Growth of Filamentary Crystals of Aluminum Nitride, Portnoi et al., Izvestiya Akademii Nauk SSSR, Neorganischeskie Materialy, Vol. 6 (10) pages 1762 to 1767 (1970); and Growth of AlN Whiskers During the Nitriding of Aluminum, Portnoi et al., Poroshkovaya Metallurgiya No. 5 (89) pages 10 to 14 (1970). The methods of these additional references form whiskers, essentially acicular single crystal fibers. Thus, these are not polycrystalline AlN fibers as disclosed herein.

Canada 839,321 discloses AlN by carbothermal reduction of alumina. Japan 61-124626 discloses a method for making AlN fibers from aluminum metal fibers or from a solution of an aluminum compound. U.S. Pat. No. 3,846,527 and U.S. Pat. No. 4,010,233 make reference to metal nitride fibers. This route to AlN fibers' uses the carbothermal reductive nitridation reaction. Significant carbon residues characterize the AlN fibers disclosed in U.S. Pat. No. 4,740,574. U.S. Pat. No. 3,529,044 discloses aluminum carbide and that if nitrogen is used, then metal nitride fibers are produced. U.S. Pat. No. 3,658,979 discloses large diameter fibers with a thin film of AlN on the surface. EPA 213,629 discloses aluminum nitride fibers prepared by heating precursor fibers, spun from a solution of aluminum oxychloride and polyvinyl alcohol, in nitrogen. U.S. Pat. No. 4,761,388 discloses an inorganic fiber composed essentially of fine crystals of an aluminum compound, which contains at least 10% by weight of aluminum nitride and the rest of the aluminum compound being alumina.

A predominant theme among many of these references is to minimize the amount of oxygen in formed AlN fibers, to enhance thermal conductivity. This emphasis does not recognize the potential usefulness of AlN fibers as high strength reinforcement in composites and shaped articles. It would be valuable to develop an aluminum nitride fiber that exhibits superior strength and properties for these and other uses.

Accordingly, an object of the present invention is the development of aluminum nitride fibers having high strength. It is a further object of the present invention to provide high strength AlN fibers that are used to reinforce a multitude of shaped articles including composites. A feature of the present invention is the incorporation of significant amounts of oxygen into the fibers, to facilitate the high strength properties. It is an advantage of the present invention to provide AlN fibers that do not tend to adhere to one another.

These and other objects, features and advantages of the present invention will become readily apparent upon having reference to the following description of the invention.

SUMMARY OF THE INVENTION

This invention concerns a shaped article of polycrystalline aluminum nitride having a tensile strength of at least about 100 Kpsi ($7 \times 10^8$ Pa). Preferred articles are in the form of fibers. To achieve shaped articles, especially fibers, of good physical properties, it is preferred that they have an oxygen content between about 1.5 and about 6 (and preferably between about 2 and about 3) weight percent.

This invention still further concerns composites of polycrystalline AlN fibers in a matrix of organic polymer, inorganic polymer, metal, glass (including glass-ceramic and crystallizable glass) or a polycrystalline ceramic. Thus, it is intended that the polycrystalline aluminum nitride article of the present invention be useful in composites. The shaped aluminum nitride objects of this invention are characterized by superior tensile strength.

This invention further concerns processes for the preparation of polycrystalline aluminum nitride fibers having superior tensile strength. A process comprises (a) introducing dialkylaluminum amide into a suitable reaction vessel;

(b) doping the dialkylaluminum amide with oxygen in an amount sufficient to provide at least about 1.5 weight percent oxygen in the polycrystalline aluminum nitride fibers;

(c) polymerizing the dialkylaluminum amide doped with oxygen to an organoaluminum precursor;

(d) melt spinning the precursor into fibers;

(e) curing the fibers of step (d);

(f) heating the fibers of step (e) at a temperature sufficient to pyrolyze the fibers of step (e); and (g) sintering said pyrolyzed fibers to form polycrystalline aluminum nitride fibers.

DETAILED DESCRIPTION OF THE INVENTION

The polymer precursors for the AlN-containing (including AlN) materials of this invention are made by combining $R_3Al$ and dialkylaluminum amide (individually synthesized) in the proper molar ratio, and heating; or, by adding $NH_3$ to trialkylaluminum to generate in situ the desired molar ratio of $R_3Al$ and dialkylaluminum amide, followed by heating. R is individually selected from $C_xH_{2x+1}$, wherein X is 1 to 10; hydrogen; halogen; phenyl; naphthyl; biphenyl; and phenyl, naphthyl and biphenyl substituted with $C_1$ to $C_{10}$ alkyl, $C_1$ to $C_{10}$ alkoxy, and/or halogen; no more than one of the R groups being fluoride.

The viscosity of the polymer varies with the reaction time and temperature as well as the quantity of $R_3Al$ supplied to the system. The polymer can be made as a viscous liquid, or a glassy solid which is converted at temperatures above 40° C. to a viscous liquid. Fibers, even continuous fibers, can be drawn from the melt and cooled to ambient temperatures with retention of fiber morphology. Alternatively, fibers can be drawn from compositions made by plasticizing the polymer with common organic solvents such as methylene chloride, n-hexane, cyclohexane, toluene, and the like, and evaporating solvent from the polymer, with preservation of the fibrous morphology. Fibers also can be prepared by pulling with a glass rod dipped into the molten or plasticized polymer or by use of conventional melt-spinning equipment.

Treatment of the polymer in whatever form or shape with ammonia, hydrazine or similar nitrogen-containing compound cures it so that it is no longer fusible. One typical method for curing the polymer is to treat it in a stream of gas containing about 10% to 99% ammonia in nitrogen, or pure ammonia, at a pressure of about 1 mm to 10 atmospheres ($10^2$–$10^6$ Pa) and at a temperature of about 50° C. to 175° C. Heating the cured polymer at about 800° to 1000° C. in the presence of ammonia, hydrazine or the like will convert it to high purity aluminum nitride. The density of the aluminum nitride so produced can be increased by heating it to about 1800° C. Shaped articles such as films, tapes, composites and the like, as well as fibers, can be prepared, cured and converted to aluminum nitride by the procedure described above.

One way to incorporate oxygen into the AlN fibers is to pass water vapor diluted with an inert gas through the dialkylaluminum amide that is used to make the thermoplastic polymer. It is preferable to bubble nitrogen containing water vapor through the dialkylaluminum amide. Alternatively, to incorporate levels of oxygen above about 6 weight percent into the AlN fibers (up to about 15 weight percent), the pyrolyzed fibers are exposed to moist air prior to sintering. However, this latter technique provides for up to one-third of the final AlN ceramic article being gamma aluminum oxynitride phase. When water is used to dope the dialkylaluminum amide, gamma aluminum oxynitride is formed within the fibers during sintering. The aluminum oxynitride phase melts at a lower temperature than AlN, compromising fiber strength and limiting its use at high temperatures. Nonetheless, in certain environments where high tensile strength and/or high temperature performance requirements are not as stringent, shaped articles of polycrystalline aluminum nitride and gamma aluminum oxynitride are beneficial. With respect to the sintering step of the present procedure, it is sufficient to heat the pyrolyzed fibers at a high temperature in nitrogen. Various sintering aids may be used in this process as is readily appreciated by those skilled in the art.

Utility and Composite Formation

The polymer precursor can be melt-shaped and converted to aluminum nitride of corresponding morphology by treatment in accordance with the foregoing description, or solubilized and shaped in accordance with liquid-handling techniques. For example, fibers or tapes of AlN are prepared by extruding the polymer from a die of appropriate thickness, curing, and heating at about 800° to 1800° to form fibers or tapes of aluminum nitride. If a solvent is used, it can then be removed in any convenient manner and the polymer cured and converted to aluminum nitride.

Composites of polycrystalline AlN fibers according to the invention can be made by combining the AlN fibers with polymers or other conventional matrix materials such as ceramic matrices. Volume fraction of the fibers is between about 0.05 and about 0.60. Such composites are useful in heat conduction applications, especially in preparation of dense microcircuitry where heat generation is a problem.

All AlN-containing materials of this invention are useful to raise tensile strength and modulus values of matrices to which they are added. For instance, they can be added to any compatible organic or inorganic polymer, metal, glass or polycrystalline ceramic compositions to serve that function. The shaped articles of AlN can be admixed with the polymer, metal, glass, or ceramic precursor as is understood by one skilled in the art. Subsequent polymerization, polymer blending, metal, glass or ceramic formation will then result in a composite admixture having good strength.

The shaped articles according to the present invention are not the simple shapes which one can form from hot pressing or pressureless sintering of cold-pressed compacts. Instead, more complex shapes are formable by extrusion through small dies (such as spinnerets). Most preferably the shaped articles are fibers.

The following Examples illustrate the invention. Procedures and reactions were conducted under an atmosphere of nitrogen or, where noted, ammonia or ammonia-nitrogen mixtures.

Procedures for Making Polymer Precursor and Examples for Making AlN

Procedure 1

Preparation of Oxide-Free Polymer

Eighty mL of triethylaluminum was stirred in a 500 mL round-bottomed flask and treated with gaseous ammonia at 24° C. to 65° C. under conditions that exclude air and moisture. An excess of ammonia was supplied to insure that the reaction proceeded to completion. The reaction mixture consisted of $(C_2H_5)_2AlNH_2$ and ammonia. Excess ammonia was evaporated from the stirred mixture by warming it to 56° C. under a vacuum of about 0.1 tort (10 Pa). The product was $(C_2H_5)_2AlNH_2$.

A solution of the $(C_2H_5)_2AlNH_2$ (2.5 g) and $(C_2H_5)_3Al$ (0.35 g) was heated at between 144° C. to 164° C. for 0.5 hours. The product, a polymeric reaction product of amidodiethylaluminum and triethylaluminum, was a viscous liquid at the synthesis temperature.

Procedure 2

Preparation of Oxide-Free Polymer Fibers

A portion of the viscous liquid product from Procedure 1 was heated to 165° C. and fibers were drawn from the melt. Upon cooling to ambient temperature the fibers were converted to a glassy solid with retention of the fiber morphology.

EXAMPLE 1

Diethylaluminum amide, $(C_2H_5)_2AlNH_2$, was prepared as described above in Procedure 1. It was partially hydrolyzed, and, using steps outlined in Procedure 1, converted to an organoaluminum polymer.

Diethylaluminum amide is partially hydrolyzed by passing a gaseous mixture of nitrogen and water vapor, 1.38 g, through stirred diethylaluminum amide, 100 g. The amount of water introduced corresponds to 3% oxygen in the final AlN product. Triethylaluminum, 1.0 g, was combined with the partially hydrolyzed diethylaluminum amide, and oxygen-doped organoaluminum polymer was prepared by heating the mixture near 150° C. until 18.83 L of ethane had been produced. After removing dissolved gases, plugs of the polymer were cast in cylindrical containers.

Fibers were spun by extruding through a spinneret hole (0.01 in. dia., 0.01 in. length) at 104° C. Fiber was wound onto a bobbin at approximately 100 meters/min under nitrogen. Skeins of fibers were pyrolyzed by heating in ammonia at 1° C./min to 230° C., then at 10° C./min to 900° C. These fibers were placed in alumina boats on a graphite hearth in a tungsten furnace and heated under nitrogen at 40° C./min up to 1600° C. and held at that temperature for 10 min.

The tensile strength of these fibers was measured on individual filaments of 0.25 inch gauge length. The average strength from 10 tensile breaks was 103 Kpsi. The average diameter was 31 micrometers.

EXAMPLES 2 AND 3

Fibers from Example 1 were separated after pyrolysis in ammonia and heated (separately) in nitrogen to 1700° and 1800° C.

The tensile strengths were:

|  | Final T | Average Strength | Number of Filaments Tested |
|---|---|---|---|
| Ex. 2 | 1700° C. | 119 Kpsi | 10 |
| Ex. 3 | 1800° C. | 120 Kpsi | 10 |

COMPARATIVE EXAMPLES

Comparative Example A 100 g of diethylaluminum amide and 2.0 g of triethylaluminum were combined and polymerized at approximately 160° C., as described previously. 20.89 liters of ethane evolved. Fibers were spun by extrusion at 124° C. through a spinneret (0.006 in. diameter, 0.012 in. long). Fibers were pyrolyzed by heating at 2° C./min from 40° C. to 230° C., then at 10° C./min to 1000° C. These fibers were then heated to 1800° C. in a graphite tube furnace, held at that temperature for 10 min, then cooled. Tensile strength of 20 filaments averaged 30 Kpsi. (Average diameter was 16.5 micrometers).

Comparative Example B 100g of diethylaluminum amide and 2.0 g of triethylaluminum were combined and polymerized at about 160° C. 20.4 liters of ethane evolved. Fibers were spun by extrusion through a spinneret (0.01 in. diameter, 0.015 in. long) at 102° C. These fibers were pyrolyzed in ammonia by heating at 3° C./min to 150° C., at 5° C./min to 300° C., and then rapidly to 900° C. These were then heated in nitrogen to 1700° C. Tensile strength, measured as above, was 52 Kpsi (average of 20 filaments). Average diameter was 39.5 micrometers.

A comparison of Examples 1–3 to Comparative Examples A and B shows that fibers prepared according to the invention have a high tensile strength (103–120 Kpsi illustrated) compared to fibers formed without the intentional doping of oxygen (30 and 52 Kpsi illustrated).

It is to be understood that a wide variety of modifications can be made to the present invention without departing from the spirit and the scope thereof.

We claim:

1. A process for the preparation of polycrystalline aluminum nitride fibers having superior tensile strength, comprising:

(a) introducing dialkylaluminum amide into a suitable reaction vessel;

(b) doping the dialkylaluminum amide with oxygen in an amount sufficient to provide at least about 1.5 weight percent oxygen in the polycrystalline aluminum nitride fibers;

(c) polymerizing the dialkylaluminum amide doped with oxygen to an organoaluminum precursor;

(d) melt spinning the precursor into fibers;

(e) curing the fibers of step (d);

(f) heating the fibers of step (e) at a temperature sufficient to pyrolyze the fibers of step (e); and (g) sintering said pyrolyzed fibers to form polycrystalline aluminum nitride fibers.

2. The process of claim 1 wherein step (b) is accomplished by bubbling nitrogen containing water vapor through the dialkylaluminum amide.

3. The process of claim 1 wherein step (e) is accomplished by treating said fibers with a nitrogen-containing compound.

4. The process of claim 1 wherein step (g) is accomplished by heating said pyrolyzed fibers at a high temperature in nitrogen.

5. The process of claim 1 further comprising exposing said pyrolyzed fibers to moist air prior to sintering.

6. The process of claim 1 wherein water is introduced in step (b) and gamma aluminum oxynitride is formed within said fibers during step (g).

* * * * *